United States Patent [19]
Rinella

[11] Patent Number: 4,650,240
[45] Date of Patent: Mar. 17, 1987

[54] WINDSHIELD MOUNTING ASSEMBLY

[76] Inventor: Richard J. Rinella, 7435 Seaview Pl., El Cerrito, Calif. 94530

[21] Appl. No.: 827,157

[22] Filed: Feb. 3, 1986

Related U.S. Application Data

[63] Continuation-in-part of Ser. No. 697,730, Feb. 4, 1985, abandoned.

[51] Int. Cl.$^4$ ................................................ B60J 1/02
[52] U.S. Cl. ........................................ 296/93; 52/208; 49/475
[58] Field of Search ..................... 296/84 R, 84 A, 93; 52/208, 716, 1, 718; 49/475, 485

[56] References Cited

U.S. PATENT DOCUMENTS

| | | | |
|---|---|---|---|
| 2,549,315 | 4/1951 | Kramer | 296/84 R |
| 3,774,363 | 11/1973 | Kent | 52/208 |
| 4,165,083 | 8/1979 | Dochnahl | 296/93 |
| 4,292,774 | 11/1981 | Mairle | 52/208 |
| 4,295,306 | 11/1981 | Garman | 52/208 |
| 4,401,340 | 8/1983 | Ankrapp et al. | 296/93 |

FOREIGN PATENT DOCUMENTS 469852 12/1950 Canada .................................. 296/93

Primary Examiner—Robert R. Song
Attorney, Agent, or Firm—Robert B. Chickering; Glen R. Grunewald

[57] ABSTRACT

The assembly of the present invention is particularly designed for the mounting of a windshield on a motor vehicle where the windshield is vulnerable to impact from outside or from inside the vehicle due to collision and the like, although the invention may have a more generalized application for the securing of a glass pane in window openings. Briefly the assembly comprises the following elements:

a windshield and an annular attaching member extending peripherally around and bonded to the windshield and extending radially from the outer edge of the windshield and being dimensioned and shaped for mounting in confronting relation to the conventional pinch weld flange of the vehicle, or equivalent;

an annular resiliently compressible gasket dimensioned and shaped for mounting between the attaching member and flange and providing a seal therebetween; and fasteners for securing the attaching member and flange and placing the gasket under partial compression and which are formed to cofunction with the member and flange to provide a resiliently floating mounting of the windshield. A final piece of annular trim is adapted for securing by either the fasteners or the supporting member and provides a finished closure between the outer edge of the windshield and the adjacent vehicle body.

14 Claims, 6 Drawing Figures

WINDSHIELD MOUNTING ASSEMBLY

This application is a continuation-in-part of application Ser. No. 06/697,730 Filed Feb. 4, 1985, now abandoned.

This invention relates to windshield mounting assemblies for motor vehicles.

BACKGROUND OF THE INVENTION

Typically, motor vehicles have a windshield opening defined by a surrounding body flange. In a conventional windshield mounting assembly, a bead of curable adhesive secures the glass windshield to this surrounding flange. Illustrative of this approach are the patent to Ankrapp et al., U.S. Pat. Nos. 4,401,340, and the patent to Kent, 3,774,363. Alternatively, the windshield may be secured by means of a resilient sealing ring, as shown in U.S. Pat. Nos. 2,549,315 and 4,165,083 to Kramer and Dochahl which are relatively complex in structure, difficult in installation and in obtaining a good and permanent seal. Less relevant and more specialized applications are shown in Garmen, U.S. Pat. No. 4,295,306, which is directed to the use of a resilient sealing retainer for a window in a vehicle subject to heavy vibration; in Mairle, U.S. Pat. No. 4,292,774, which shows a sealing strip for adhesively bonding two adjacent windows together; and Hicks, Canadian Pat. No. 469,852, where the windshield forms a structural part of the vehicle body.

When a windshield mounted in the conventional manner needs to be replaced, it is impossible to effect removal without causing damage to the windshield due to the adhesive bonding. Frequently in removing a windshield mounted adhesively to the surrounding flange, the windshield shatters or needs to be shattered to effect its removal. The resultant flying glass shards and broadcasting of glass fragments may result in a serious injury to the workman, damage to the vehicle's finish, and embedment of glass fragments into the interior upholstery. Additionally, this type of mounting assembly requires highly skilled workmen and specialized tools, resulting in high labor costs and shop-time and the amount of time the vehicle is off the road for repairs. If the seal around the windshield is leaking, the entire windshield normally must be replaced or reset, exposing the workmen to danger and involving an inordinate amount of time. Additionally, the conventional mounting of the windshield results in a rigid support of the windshield making it more apt to shatter in case of collision or when subjected to sudden stress. Also the bond obtained by repair shops between the windshield and vehicle body is frequently less than perfect or is not given adaquate time to cure, with the result that the windshield may be dislodged or water leakage may subsequently occur. The advent of momentary high air pressure within the vehicle, such as occurs when a door is closed with all of the windows up, may cause displacement of incompletely cured bonding material and resulting openings therein.

SUMMARY OF THE INVENTION

This invention is a windshield mounting assembly that overcomes or greatly mitigates all of the above mentioned problems. It is an object of this invention to provide a windshield mounting assembly that can be safely and expeditously inserted in and secured to the surrounding flange of the vehicle during manufacture, and at the same time allow the easy and safe removal of a windshield from a vehicle without the necessity for breaking a bonded connection between them, and with equal facility permit a repair shop to safely and rapidly install a new windshield in the vehicle. Briefly stated, the central concept of the present invention is the provision of a resiliently floating mounting for a windshield on a vehicle body having a windshield opening defined by a surrounding flange and which consists in bonding a windshield generally conforming in shape to the opening to a supporting memeber dimensioned to extend around the windshield periphery and into overlying relation with the flange, securing the supporting member to the flange with a resiliently compressible gasket interposed therebetween by fasteners placing the gasket under partial compression and permitting reciprocation of the member to and from the flange so as to thereby obtain a full floating support for the windshield. Preferably the attaching member is extended beyond the windshield periphery, a feature which virtually eliminates glass breakage during shipment and handling due to protection afforded the edge, its weakest area, from breakage. Due to the manner in which the windshield is installed, the windshield "floats" in the vehicle opening on a soft, compressible, gasket, such as neoprene and breakage of the windshield is greatly reduced in the event of collision, or imposition of other sudden stress, or vehicle body distortion. Of importance in the foregoing concept is the manufacture of the windshield and its supporting member by the original vehicle or windshield manufacturer, and as a separate article of manufacture, which may be furnished to the vehicle manufucturer or windshield repair shops as a replacement part. The factory bonded windshield-attaching member insures that every windshield replaced will be equal in quality to the original factory installation. Additionally, the windshield mounting structure is formed for interlocking with a molding member that spans the body and the windshield to provide an attractive high quality connection between the windshield and the body. All of the foregoing may be readily accomplished rapidly, safely, and inexpensively by the original vehicle manufacturer, and with equal facility, safety and low cost by a windshield repair shop doing a windshield replacement. The result in both cases is that the windshield mounting is dependably waterproof and best able to withstand the high stresses impossed on it due to direct impact or transferred to it by accidental collision of the vehicle, or other damage to, or distortion of, the adjacent vehicle body.

DETAILED DESCRIPTION OF THE INVENTION

Figure 3:
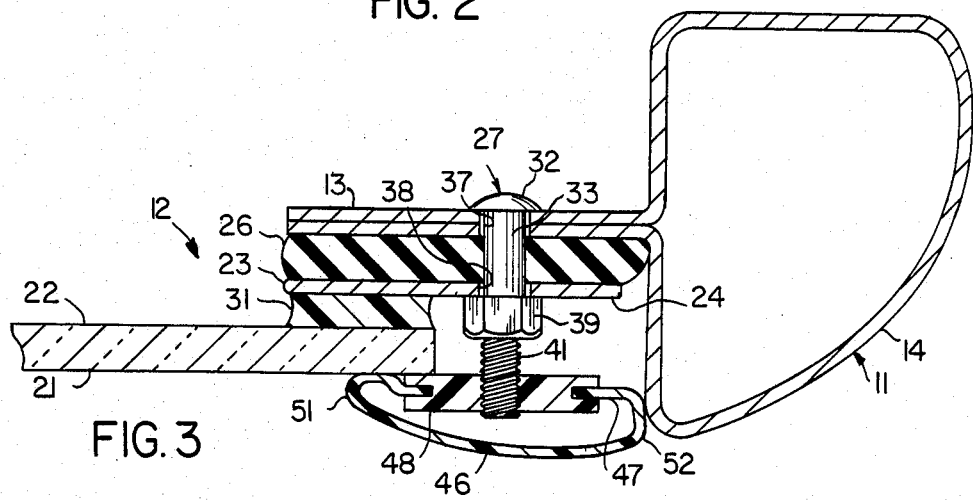
FIG. 3 is an enlarged, partial cross-sectional view of the assembly taken substantially on the plane of line 3—3 of FIG. 1.

The windshield mounting assembly of the present invention is designed for a vehicle body 11 having a windshield opening 12 defined by a surrounding flange 13, commonly referred to as the pinch weld, forming part of the conventional windshield post 14, and comprises briefly a windshield 21 conforming in shape to the opening 12; an attaching member 23 extending peripherally around the windshield, normally at its inner side 22 and preferably having a portion 24 extending from the outer periphery of the windshield and being dimensioned and shaped for mounting in confronting relation to flange 13; a resiliently compressible gasket 26, see FIG. 3, dimensioned and shaped for mounting between member 23 and flange 13 and being of continuous annular form to provide a seal therebetween, and a plurality of fasteners 27 for securing member 23 and flange 13 placing gasket 26 under partial compression; the fasteners, member 23 and flange 13 being formed to cofunction with gasket 26 to provide a resiliently floating mounting of the windshield on flange 13. Gasket 26 is preferably formed of a soft, compressible, closed cell, neoprene foam, or equivalent material. While the windshield 21 and its attaching member 23 may be mounted at either the outside or inside the vehicle, the latter, as here shown, is preferred.

As a feature of the present invention, a lamina 31 of elastomeric sealing material, such as polyurethane, is mounted between the windshield 21 and member 23 and provides a bond therebetween. In addition to providing an excellent, durable bond and seal, when properly installed and allowed adequate time to cure, presently 24 to 48 hours or longer, the polyurethane lamina provides augmented resiliency to the mounting of windshield 21.

It is important that member 23 be formed for mounting for reciprocation on fasteners 27 so as to provide for the resiliently floating mount for windshield 21. As here shown, fasteners 27 comprise bolts having heads 32 seated on the normally interior side of flange 13 and having smooth shanks 33 extending through aligned openings 37 and 38 in flange 13, gasket 26 and portion 24 of attaching member 23 respectively. Portion 24 is here secured by nuts 39 threaded on the outer ends of bolts 27 in spaced relation from the periphery of windshield 21. As will be observed, see FIG. 3, attaching member 23 is thus mounted for reciprocation on the preferably smooth shank 33 of bolts 27 and tightening of nut 39 provides a desired partial compression of gasket 26. At the same time the free reciprocation of member 23 on the bolt shank permits further compression of gasket 26 and the desired resilient floating mount for windshield 21 permitting it to withstand impact, body collision or other similar type stress. Preferably also, openings 37 and 38 are substantially larger in diameter than shanks 33 so as to afford limited vertical and lateral floating support of the windshield.

Figure 1:
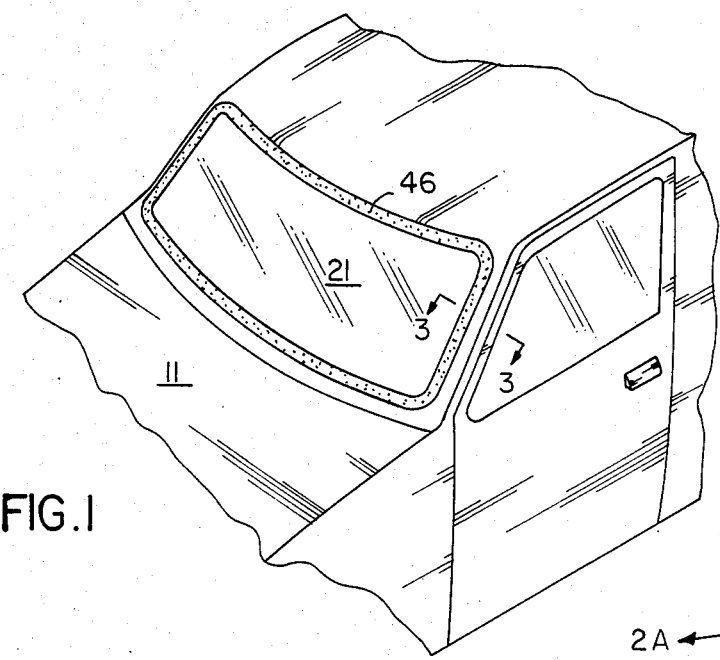
FIG. 1 is a perspective view of a vehicle windshield mounting assembly constructed in accordance with the present invention.
Figure 2A:
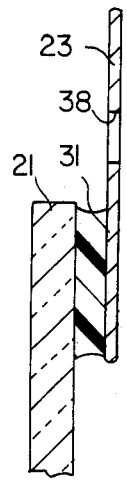
FIG. 2A is an enlarged fragmentary cross-sectional view taken substantially on the plane of line 2A in FIG. 2.
Figure 2:
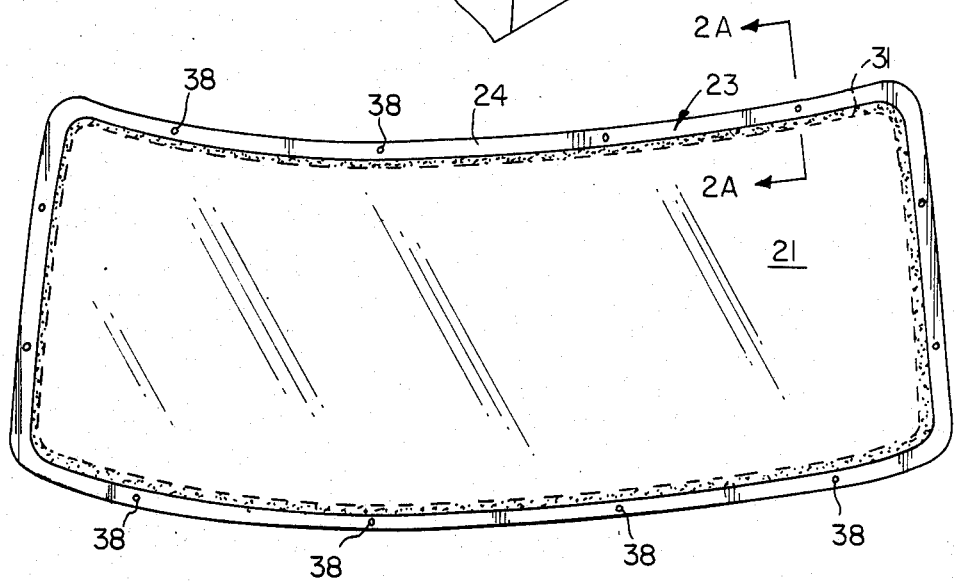
FIG. 2 is a somewhat enlarged front elevation of the windshield mounting with the front trim removed to show the pattern of distribution of the detachable fasteners forming part of the assembly.

As another feature of the present construction, attaching member 23 is formed as a flat annular strip of sheet metal or the like having adequate strength but providing flexure, and is dimensioned for mounting on fasteners 27 in space relation to the outer peripheral edges of the windshield so as to provide both protection of the outer edge of the windshield and at the same time to permit resilient flexure and augmented resilient mounting of the windshield, protecting it from breakage from impact whether from outside or inside of the vehicle body. The general arrangement may be best seen in FIG. 2 wherein the annular portion 24 of the attaching member extends from the outer annular edge of the windshield and contains a series of circumferentially spaced openings 38 dimensioned to slidably receive the shank portions of bolts 27 to reciprocate thereon to and from pinch weld flange 13. Additionally, and in accordance with the present invention, openings 38 and the fasteners are well spaced from the corners of the windshield to particularly provide a free floating of the corners which are the most vulnerable to damage in the event of a collision or other distorting strain on the windshield and its support.

In this form of the invention advantage is taken of the fasteners 27 to also secure to the assembly an annular molding 46 which is shaped and dimensioned to span the periphery of the windshield and the adjacent body of the vehicle and which is formed for demountable securing to the fasteners. As here shown, molding 46 is of annular form of hollow tubular cross-section, see FIG. 3, and is provided at its inner side 47 with a centrally located snap washer 48 which may be pressed onto the outer threaded end 41 of fastener 27 to secure the molding in place. A plurality of such snap rings 48 are provided to register with the outer ends 41 of the plurality of fasteners. The molding is here shown of flat oval form having opposite side edges 51 and 52 which overhang and engage the windshield and engage and seal against the adjacent vehicle body. Attachment of the molding only requires the pressing of the snap washers onto the outer ends of the fasteners, and removal of the molding may be accomplished by the reverse operation of withdrawing the snap washers from the fasteners.

Figure 4:
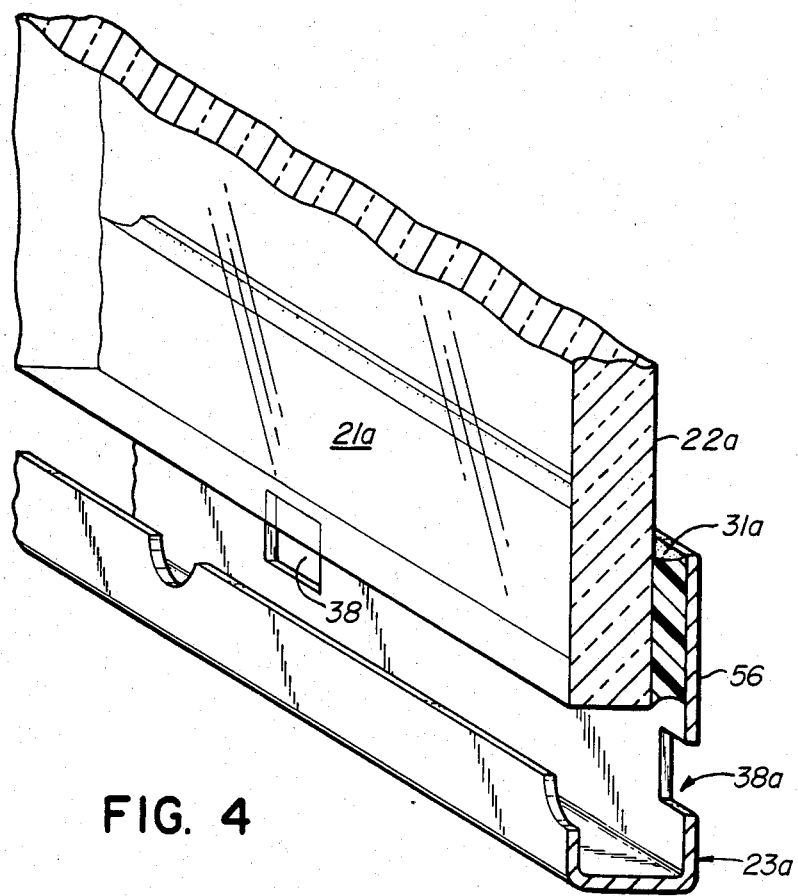
FIG. 4 is a partial cross-sectional perspective view of a modified form of the invention, the view being the same as FIG. 2 in the drawing of the parent application.
Figure 5:
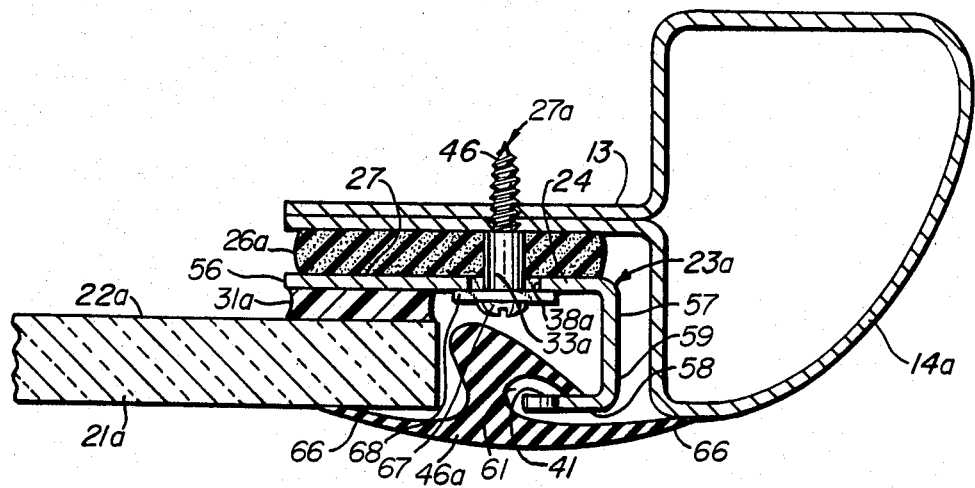
FIG. 5 is an enlarged cross-sectional view of the windshield and attaching member of FIG. 4 mounted on an automotive vehicle and with the exterior finished trim applied, the view being the same as FIG. 4 of the parent application.

A modified form of the invention is illustrated in FIGS. 4 and 5 of the drawing which have been taken from Applicant's parent application. In this form, the attachment member 23a comprises a base side 56 attached to the normally inner side 22a of windshield 21a by an annular lamina 31a of sealing material such as polyurethane. Additionally, base side 56 has a plurality of circumferentially spaced openings 38a which are dimensioned to slidably mount on smooth shank portions 33a of a plurality of fasteners 27a so as to place in partial compression an annular elastomeric gasket 26a as in the first described embodiment. Square slotted holes 38a in the attaching member provide simplified alignment of the fasteners with holes in the pinch weld flange. A difference between the two embodiments is the manner in which the outside molding 46a is supported. In the form illustrated in FIGS. 4 and 5, the base side 56 is formed with an integral inverted, annular, L-shaped wall 57 which has a return outer end 58 which serves as a detent for securing a continuous annular elastomeric molding 46a. The molding is here shown of generally T-shaped cross-section having an annular stem section 59 surrounding the windshield and formed with an annular recess 61 formed to receive and interlock with the inturned hook or detent end 41 of member 23a. Stem portion 59 of the molding is of continuous annular form encircling the windshield periphery. The remainder of molding 46a is an annular canopy section 66, which spans windshield 21a and the adjacent surface of the vehicle body 14a and is forced into compression against the windshield and body by the positioning of recess 61 an hook end 41 so as to provide an effective closure of and sealing off of the space between the windshield periphery and the adjacent opposed body portion.

In both forms of the invention, the windshield has a resiliently floating support so as to best withstand impact and sudden stress, the principle feature of the support in this regard being continuous annular gasket 26 which cushions the mounting of attaching member 23, or 23a. The gasket is preferably formed of relatively soft durable waterproof material such as neoprene which also conforms to minor irregularity in the nominally planar surface of flange 13 surrounding the windshield opening.

Fasteners 27 may be in any form such as bolts, machine screws, rivots or the like providing for ready inexpensive installation to secure member 23 to confronting flange 13 while permitting reciprocal movement therebetween to afford the desired cushioning mount on gasket 26. The fasteners need additionally to have the characteristic of rapid, easy removal and replacement by a windshield repair shop. The fastener screws are preferably formed at the distal end of their smooth shanks 33 so as to bottom on nuts 39, in the first embodiment and on the pinch weld flange 13 in the second embodiment to prevent uneven tightening of the windshield support which could otherwise cause windshield breakage. Nuts 39 need have sufficient width, in the first embodiment, and the heads 67 of screws 33a in the second embodiment need have sufficient width to span the enlarged openings 38. Otherwise washers 68 as shown in FIG. 5 may be used for the same purpose. A fastener having a threaded end, such as end 41 here shown, has the additional advantage of conveniently and expeditiously securing the surrounding molding 46 providing a finished trim between the windshield and surrounding body.

In both forms here shown, and as a principle feature of the present invention, windshield 21 and attaching member 23 are designed to be produced as a separate article of manufacture by the original equipment or windshield manufacturer and furnished to the vehicle manufacturer or windshield repair shop as a ready to install part. This is important because under existing procedures, windshields are secured to the surrounding pinch weld flange by a bead of polyurethane adhesive applied by the windshield repair shop and which requires 24 to 48 hours or longer to cure. Many times the vehicle is released by the shop before the seal has completely cured thus leaving the windshield vulnerable to dislodgement and the seal vulnerable to piercing by a sudden change in internal air pressure in the vehicle such as upon rapidly closing one of the doors with all windows closed.

What is claimed is:

1. A windshield mounting assembly for a vehicle having a windshield opening in the body of the vehicle and defined by a surrounding flange, comprising:
   a windshield conforming in shape to said opening;
   an attaching member extending peripherally around and bonded to the said windshield and being dimensioned and shaped for mounting in confronting relation to said flange;
   a resiliently compressible gasket dimensioned and shaped for mounting between said member and flange and being of continuous annular form to provide a seal therebetween;
   fasteners for securing said member and flange and placing said gasket under partial compression; and
   said fasteners, member and flange being formed to cofunction with said gasket to provide a resiliently floating mounting of said windshield on said flange.

2. The windshield mounting assembly of claim 1,
   said member extending outwardly in spaced relation to the outer peripheral edges of said windshield to provide protection therefore.

3. The windshield mounting assembly of claim 2,
   said member having a substantially flat form capable of resilient flexture and form for mounting on said fasteners in outward spaced relation to the peripheral edges of said windshield to provide augmented resilient mounting thereof.

4. The windshield mounting assembly of claim 1 having a lamina of elastomeric sealing material between said windshield and member and providing the bond therebetween and augmented resilient mounting of said windshield.

5. The windshield mounting assembly of claim 1,
   said member being formed for mounting for reciprocation on said fasteners.

6. The winshield mounting of claim 1, and an annular molding shaped and dimensioned to span said windshield and body and formed for the demountable securing to said fasteners.

7. The windshield mounting assembly of claim 1,
   said member having an annular, generally rectangular shape and formed with a plurality of circumferentially spaced openings adapted to receive said fasteners for reciprocation thereon to and from said flange; and
   said openings and fasteners being spaced from the corners of said windshield to provide a free floating thereof.

8. The windshield mounting assembly of claim 7, said openings being substantially larger than said fasteners so as to provide resiliently floating vertical and lateral movement of said windshield.

9. The windshield mounting assembly of claim 1,
   and detente means mounted on said member for engagement with and securing of a molding spanning said windshield and body.

10. The windshield mounting assembly of claim 9,
    said detente means comprising an upstanding leg and hook portion; and
    a molding having a portion spanning said windshield and body and a second portion formed for interlocking with said hook portion.

11. The windshield mounting assembly of claim 10,
    said member comprising a base plate attached to said windshield;
    and said detente means being formed as an integral inverted L-shaped wall surrounding said base plate.

12. The windshield mounting assembly of claim 11,
    said molding member being generally T-shaped in the cross-section having an annular stem surrounding said windshield and forming said second portion and having an annular recess formed for receipt of an interlocking with said hooked portion and an annular canopy section spanning said windshield and exterior surface of said body; and said recess and hook portion being positioned to force said canopy in compression against said windshield and body.

13. The method of providing a resiliently floating mounting for a windshield on a vehicle body having a windshield opening defined by a surrounding flange;

bonding to a windshield generally conforming in shape to said opening, a support member demensioned to extend around the windshield periphery into overlying relation to said flange; and securing said member to said flange with a resiliently compressible gasket interposed therebetween by fasteners placing said gasket under partial compression and permitting reciprocation of said member to and from said flange.

14. A method of claim 13 wherein said windshield and member may be assembled by original equipment manufacturers as a separate article of manufacture and furnished to the vehicle manufacturers or windshield repair shops as a replacement part.

* * * * *